(12) United States Patent
Agrawal et al.

(10) Patent No.: US 10,659,558 B2
(45) Date of Patent: *May 19, 2020

(54) SAVING BANDWIDTH IN TRANSMISSION OF COMPRESSED DATA

(71) Applicant: International Business Machines Corporation, Armonk, NY (US)

(72) Inventors: Dakshi Agrawal, Monsey, NY (US); Vasileios Pappas, Elmsford, NY (US); Ramya Raghavendra, White Plains, NY (US); Mudhakar Srivatsa, White Plains, NY (US); Dinesh C. Verma, New Castle, NY (US); Ho Y. Wong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 15/147,546

(22) Filed: May 5, 2016

(65) Prior Publication Data

US 2016/0366241 A1 Dec. 15, 2016

Related U.S. Application Data

(63) Continuation of application No. 13/679,487, filed on Nov. 16, 2012, now Pat. No. 9,356,645.

(51) Int. Cl.
*G06F 15/16* (2006.01)
*H04L 29/08* (2006.01)
(Continued)

(52) U.S. Cl.
CPC ........... *H04L 67/2885* (2013.01); *H04B 1/66* (2013.01); *H04L 67/2842* (2013.01); *H04L 29/06* (2013.01); *H04L 29/08072* (2013.01)

(58) Field of Classification Search
CPC . H04L 67/2885; H04L 67/2842; H04L 29/06; H04L 29/08072; H04L 29/0604; H04B 1/66
(Continued)

(56) References Cited

U.S. PATENT DOCUMENTS 6,459,429 B1 * 10/2002 Deering .................. G06T 17/20
345/423
6,628,277 B1 * 9/2003 Deering .................. G06T 9/001
345/419

(Continued)

FOREIGN PATENT DOCUMENTS

EP 1498824 A2 1/2005
EP 2372918 A1 10/2011

OTHER PUBLICATIONS

Hallnor et al., "A Unified Compressed Memory Hierarchy", Proceedings of the 11th Int'l Symposium on High-Performance Computer Architecture, Feb. 2005.

*Primary Examiner* — Razu A Miah
(74) *Attorney, Agent, or Firm* — Scully, Scott, Murphy & Presser, P.C.; Kevin M. Jordan, Esq.

(57) ABSTRACT

A method, system and computer program product for transmitting content across a link in a communications network. In an embodiment, the method comprises examining traffic in the network at a sender end of the link to determine if the traffic is carrying compressed content; when the traffic is carrying compressed content, decompressing at least one portion of the compressed content; and checking a cache to determine if the cache has content matching the at least one decompressed portion of the content. In an embodiment, the method further comprises when the cache has content matching the at least one decompressed portion of the content, determining an identifier associated with the at least one decompressed portion of the content; and using the (Continued)

identifier to reconstruct, at a receiving end of the link, the at least one decompressed portion of the content. In one embodiment, the at least one decompressed portion of the content from the traffic is replaced with an index, the index is compressed to form the associated identifier, and the associated identifier is sent to the receiving end of the link.

22 Claims, 2 Drawing Sheets

(51) Int. Cl.
*H04B 1/66* (2006.01)
*H04L 29/06* (2006.01)

(58) Field of Classification Search
USPC .......................................................... 709/247
See application file for complete search history.

(56) References Cited

U.S. PATENT DOCUMENTS

| | | | |
|---|---|---|---|
| 6,630,933 B1 | 10/2003 | Van Hook | |
| RE39,017 E * | 3/2006 | Smallcomb | H03M 7/30 370/352 |
| 7,069,342 B1 * | 6/2006 | Biederman | H04L 69/04 709/246 |
| 7,620,012 B2 * | 11/2009 | Farineau | H04B 7/18543 370/329 |
| 7,773,634 B1 | 8/2010 | Machiraju | |
| 7,965,740 B2 | 6/2011 | Chun et al. | |
| 8,149,831 B2 * | 4/2012 | Balachandran | H04L 69/04 370/390 |
| 8,392,616 B2 | 3/2013 | Huang et al. | |
| 8,417,833 B1 | 4/2013 | Amdahl | |
| 8,949,466 B1 | 2/2015 | Crosbie et al. | |
| 2002/0078170 A1 * | 6/2002 | Brewer | H04L 29/06 709/218 |
| 2002/0164027 A1 * | 11/2002 | Stephenson | H04B 1/66 380/269 |
| 2003/0033435 A1 * | 2/2003 | Hanner | H04L 63/0236 709/247 |
| 2003/0079041 A1 * | 4/2003 | Parrella, Sr. | H03M 7/30 709/247 |
| 2003/0110296 A1 * | 6/2003 | Kirsch | H04L 29/06 709/246 |
| 2003/0152152 A1 * | 8/2003 | Dunne | G10L 19/18 375/241 |
| 2003/0179195 A1 * | 9/2003 | Ordentlich | G06T 9/00 345/420 |
| 2003/0204629 A1 * | 10/2003 | Sambandam | H04N 21/235 709/247 |
| 2004/0001508 A1 * | 1/2004 | Zheng | H04L 12/4633 370/466 |
| 2004/0042424 A1 | 3/2004 | Hsien-Tsung | |
| 2004/0146053 A1 * | 7/2004 | Nabhan | H04L 29/06 370/392 |
| 2005/0008023 A1 | 1/2005 | Melhorn | |
| 2005/0025081 A1 | 2/2005 | Wakamatsu | |
| 2005/0025233 A1 * | 2/2005 | Metz | H03M 7/30 375/240 |
| 2005/0063412 A1 | 3/2005 | Osmani | |
| 2005/0089046 A1 * | 4/2005 | Moussa | H04L 69/04 370/395.52 |
| 2006/0053004 A1 * | 3/2006 | Ceperkovic | H04N 19/63 704/221 |
| 2006/0221909 A1 * | 10/2006 | Farineau | H04B 7/18543 370/336 |
| 2007/0016724 A1 | 1/2007 | Gaither et al. | |
| 2007/0058610 A1 * | 3/2007 | Brandstatter | H04L 69/04 370/352 |
| 2008/0224903 A1 * | 9/2008 | Samuels | H03M 7/3084 341/51 |
| 2008/0224906 A1 * | 9/2008 | Plamondon | H03M 7/30 341/76 |
| 2008/0228850 A1 * | 9/2008 | Samuels | H04L 69/04 709/201 |
| 2008/0228933 A1 * | 9/2008 | Plamondon | H03M 7/30 709/230 |
| 2008/0228939 A1 * | 9/2008 | Samuels | H04L 67/2842 709/235 |
| 2008/0253311 A1 * | 10/2008 | Jin | H04B 1/662 370/311 |
| 2009/0022065 A1 * | 1/2009 | Chen | H04L 47/10 370/253 |
| 2009/0024763 A1 * | 1/2009 | Stepin | H04L 63/0428 709/247 |
| 2009/0144423 A1 * | 6/2009 | Marr | H04L 47/521 709/226 |
| 2009/0175360 A1 * | 7/2009 | Soni | H03M 7/30 375/241 |
| 2009/0187673 A1 * | 7/2009 | Ramjee | H04L 67/2828 709/247 |
| 2009/0234966 A1 * | 9/2009 | Samuels | H03M 7/3084 709/231 |
| 2010/0124239 A1 | 5/2010 | Hughes | |
| 2010/0241694 A1 * | 9/2010 | Jensen | H04L 69/24 709/203 |
| 2010/0248643 A1 * | 9/2010 | Aaron | H04L 1/0002 455/68 |
| 2010/0274772 A1 * | 10/2010 | Samuels | G06F 17/30156 707/693 |
| 2010/0303146 A1 * | 12/2010 | Kamay | H04N 21/2343 375/240.02 |
| 2010/0306413 A1 * | 12/2010 | Kamay | H04N 19/503 709/247 |
| 2011/0150102 A1 * | 6/2011 | Gilson | H04N 21/234327 375/240.27 |
| 2011/0271055 A1 * | 11/2011 | O'Connor | G06F 12/0802 711/118 |
| 2012/0011271 A1 * | 1/2012 | Zhao | H04W 4/18 709/234 |
| 2012/0189023 A1 * | 7/2012 | Huang | H04L 1/0006 370/477 |
| 2012/0254417 A1 * | 10/2012 | Luna | H04L 67/2828 709/224 |
| 2012/0297042 A1 | 11/2012 | Davis et al. | |
| 2012/0307842 A1 * | 12/2012 | Petrov | H04N 21/23608 370/474 |
| 2013/0051300 A1 | 2/2013 | He et al. | |
| 2013/0091266 A1 * | 4/2013 | Bhave | G06F 16/185 709/224 |
| 2013/0094356 A1 * | 4/2013 | Keith | H04L 47/2433 370/229 |
| 2013/0107895 A1 * | 5/2013 | Wentink | H04L 69/04 370/477 |
| 2013/0128809 A1 * | 5/2013 | Wentink | H04L 29/0604 370/328 |
| 2013/0128902 A1 * | 5/2013 | Ilan | H04L 69/04 370/477 |
| 2013/0219008 A1 * | 8/2013 | Zhou | H04L 67/2842 709/216 |
| 2014/0223030 A1 * | 8/2014 | Bhaskar | H03M 7/3088 709/247 |
| 2015/0124683 A1 * | 5/2015 | Stjernholm | H04L 69/04 370/312 |

* cited by examiner

SAVING BANDWIDTH IN TRANSMISSION OF COMPRESSED DATA

CROSS REFERENCE TO RELATED APPLICATION

This application is a continuation of copending U.S. patent application Ser. No. 13/679,487, filed Nov. 16, 2012, the disclosure of which is hereby incorporated herein by reference in its entirety.

STATEMENT OF GOVERNMENT INTEREST

This invention was made with Government support under Contract No.: W911NF-06-3-0001 awarded by U.S. Army. The Government has certain rights in this invention.

BACKGROUND

This invention generally relates to communication networks, and more specifically, to saving bandwidth on links in communication networks.

In the operation of a communications network, the network, or a part of the network, may become congested with data. This may happen for any one or more of a number of reasons. For example, congestion may occur when there is an increase in the use of the network of in the data traffic in the network. Congestion may also result from changes in the topology of the network or from changes in the equipment or devices within the network. Congestion may cause lost or dropped data packets, delays in the data traffic moving through the network, or otherwise result in a significant Quality of Service (QoS) degradation.

A number of procedures and mechanisms may be used to prevent or to eliminate network congestion. For instance, object caching is a technique to save bandwidth on communication links in a network when similar content is transmitted multiple times on the link. In object catching, an intermediary network node caches content when it is first served; and for subsequent accesses to the same content, the content is served from the intermediary network node instead of the original content provider. Object caching reduces overall network load.

However, in many situations, a congested bottleneck link is somewhere in the middle of the network. While an object cache reduces overall network traffic, a congested link cannot solely rely on the presence of object caches as a solution to the congestion on the link since: (a) object caches may not be deployed or they may be out of service—an object cache out of service will impact a limited set of applications but a congested link will impact all applications; (b) there may be no object cache in the path for many users due to network technology; (c) object cache in general does not provide bandwidth savings when mirrors are used or when similar or same files are downloaded via different protocols.

In such a case, a set of synchronized caches at both ends of a congested link provides a better solution that is targeted specifically at the bottleneck link. Before content enters one end of the congested link, that content is passed through the cache at the end of the link to determine if the content (or part thereof) already exists in the cache. If so, then a short index is sent to the other end of the link instead of the matched content; and at the other end of the link, matched content is recovered from the synchronized cache at that end of the link. The synchronized caching is completely complementary and transparent to object caching.

The content is often transmitted in a compressed format. For example, a server may send compressed content to a browser that is capable of decompressing content (html: Content_Encoding: gzip is a standard and all standard browsers such as firefox, chrome, IE, support compressed content). Large software are often packaged and transmitted over computer networks in a compressed format (.cab, .zip). Many document formats such as PDF are compressed. After compression, even small difference in two content C1 and C2 will result in vastly different compressed content C1.zip and C2.zip as compressed output is largely random (if it was not, it could be further compressed). For example, for 2 Microsoft Word documents, while the difference between C1.doc and C2.doc is only 1 character (i.e., ~0.6 KB bytes in binary form), the difference between the zipped version of the documents, C1.zip and C2.zip, is around 170 KB.

However, as a result of compressed content, caching techniques may be ineffective for about 15%-25% of the total network traffic. This fraction may increase in the future as storage moves to remote sites in a cloud computing environment and more compressed formats are used to save storage and bandwidth.

BRIEF SUMMARY

Embodiments of the invention provide a method, system and computer program product for transmitting content across a link in a communications network. In an embodiment, the method comprises examining specified traffic in the network at a sender end of the link to determine if the traffic is carrying any compressed content; when the specified traffic is carrying compressed content, decompressing at least one portion of the compressed content; and checking a sender cache to determine if the sender cache has content matching the at least one decompressed portion of the content from the specified traffic In an embodiment, the method further comprises when the sender cache has content matching the at least one decompressed portion of the content from the specified traffic, determining an identifier associated with said at least one decompressed portion of the content; and using the associated identifier to reconstruct, at a receiving end of the link, the at least one decompressed portion of the content from the specified traffic.

In one embodiment, the at least one decompressed portion of the content from the specified traffic is replaced with the associated identifier.

In an embodiment, an index is determined for identifying the at least one decompressed portion of the content from the specified traffic, that index is compressed to form the associated identifier, and the associated identifier is sent over the link to the receiving end of the link.

In one embodiment, the associated identifier is decompressed at the receiving end of the link to reconstruct the index for identifying the at least one decompressed portion of the content from the specified traffic.

In an embodiment, the reconstructed index is used to obtain, from a receiver cache, a copy of the at least one decompressed portion of the content from the specified traffic.

In one embodiment, the associated identifier is only used to reconstruct the at least one decompressed portion of the content from the specified traffic when one or more given conditions are satisfied.

In an embodiment, when the one or more conditions are not satisfied, the compressed content in the specified traffic is sent to the receiving end of the link.

In one embodiment, the specified traffic in the network is examined at the sender end of the link before this traffic enters the link.

In one embodiment, the method further comprises determining if any content of the specified traffic is cached at the receiver end of the link.

Embodiments of the invention provide a network decompression/compression capability that works in coordination with synchronized caching appliances on either side of a congested link. In embodiments of the invention, before the traffic enters a congested network link, the traffic is examined to determine if the traffic is carrying compressed content—the determination of which can be done either by software or hardware or a combination thereof. If the content is compressed, the content is decompressed and passed through a cache. The cache examines whether it has matching files (or portions thereof); and if the cache does, those matching files (or portions thereof) are replaced by a short index that uniquely identifies a particular content. The output of the cache is then compressed. If this process does not reduce content size, then the original compressed content is transmitted. If the process does reduce content size, the output of the cache is transmitted to the other end of the link.

At the other end of the congested link, if the received content is the compressed output of the cache at the transmitting end of the link, then the content is recovered by inversing the above-described steps. The output is decompressed and the decompressed content is parsed to identify cache indices. These cache indices are replaced by appropriate content from the cache at the receiving end of the link, reconstructing the original uncompressed byte stream. The uncompressed byte stream is then compressed and sent out in its original form.

DETAILED DESCRIPTION

Figure 1:
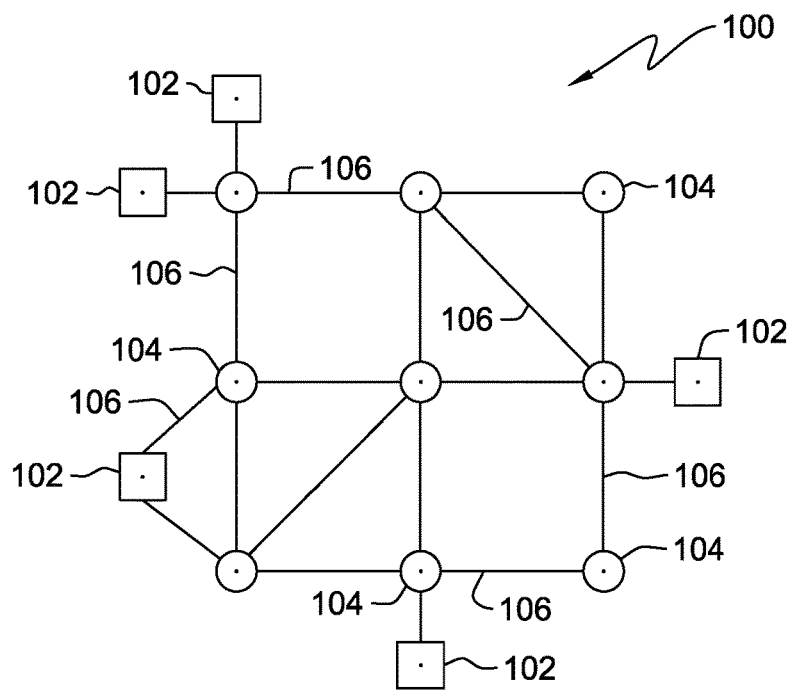
FIG. 1 depicts a network in which embodiments of the invention may be implemented.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention, generally, relates to saving bandwidth in the transmission of compressed data in a communications network. As mentioned above, a network, or a part of a network, may become congested with data, and this may adversely affect network performance. A number of techniques may be used to prevent or to eliminate network congestion. For instance, it is common practice to use data compression techniques on network data bytes in order to conserve bandwidth.

An example of potential savings for software downloads is illustrated by Tables I and II below (with numbers from July 2011) for the then latest version of Eclipse IDE).

TABLE I

|  | (1) eclipse-cpp-indigo-incubation-win32 | (2) eclipse-jee-indigo-win32 | (3) eclipse-SDK-3.7-win32 |
| --- | --- | --- | --- |
| Zipped (MB) | 107 | 240 | 190 |
| Unzipped (MB) | 120 | 212 | 174 |
| # of files | 1290 | 2850 | 1219 |

TABLE II

|  | Among (1) and (2) | Among (2) and (3) | Among (1) and (3) |
| --- | --- | --- | --- |
| # of same files | 1121 | 950 | 868 |
| Size of the same files (MB) | 82 | 104 | 63 |

Table II shows that even if three different downloads of Eclipse IDE zip archives have completely different byte patterns (as tested by diff utility), once uncompressed, one-third to two-thirds of the bytes are exactly the same. These similarities are hidden due to compression which ironically is applied to save network bandwidth (among other reasons).

A set of synchronized caches at both ends of a congested link may also be used to prevent or to alleviate link congestion. It is difficult, however, to use compressed data with synchronized caches. Embodiments of the invention add decompression and compression capability in order to facility caching on either side of the congested network link.

FIG. 1 depicts a communications network 100 in which embodiments of the invention may be implemented. Network 100 includes a multitude of nodes 102 and a multitude of network devices 104 connected together by a multitude of links 106 to form the network. As an example nodes 102 may include personal computers, servers, workstations, laptop computers, personal digital assistants (PDAs), mobile phones, or any other entities that are operable to transmit data to or in and to receive data from or in network 100.

Network devices 104 are used to route data packets from and throughout the network 100. These devices may be computer network equipment such as switches, network bridges, or routers. The network devices can be connected together in any configuration to form network 100, as will be appreciated by those skilled in the art.

Network links 106 may be established over wired networks such as, for example, local area networks (LAN) and wide area networks (WAN), or over wireless networks such as, for example, IEEE 802.11b (WiFi), General Packet Radio Service (GPRS), Universal Mobile Telecommunications Service (UMTS), Personal Communications Service (PCS), Global System for Mobile communications (GSM), Digital-Advanced Mobile Phone Service (DAMPS), Interim Standard (IS)-136, IS-95, Code Division Multiple Access (CDMA) 2000, Wide-band CDMA (W-CDMA), or Universal Mobile Telecommunications Service (UMTS) standards, or any other Personal Communications Services (PCS), Time Division Multiple Access (TDMA) or CDMA wireless network. Network links, also, may be or include suitable optical data transmission devices.

Figure 2:
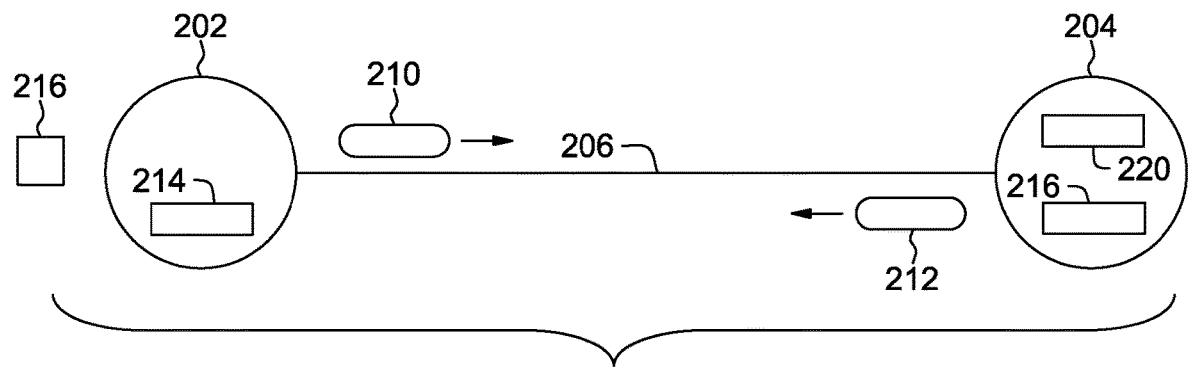
FIG. 2 shows a link of the network of FIG. 1, with a synchronized caching sender and caching receiver in accordance with an embodiment of the invention.

With reference to FIGS. 1 and 2, in the operation of network 100, a sender, represented at 202, and a receiver, represented at 204, exchange data packets over one of the links, represented at 206. This exchange may be, for example, between one of the nodes 102 and one of the network devices 104, or between a pair of the network devices 104. In a conventional packet exchange, sender 202 transmits data packets 210 to receiver 204, and the receive sends acknowledgment packets 212 back to the sender 202.

In network 100, due to changes in traffic, topology changes, equipment changes, or for other reasons, a link may become congested. This can affect the data passing through the network and cause a decrease in the Quality of Service provided by the network.

It is common practice to use compression techniques on network data bytes in order to conserve bandwidth. However, even with the use of compression, links in the network may still become congested.

Embodiments of the invention provide a network decompression/compression capability that works in coordination with synchronized caching appliances on either side of a congested link. Before the traffic enters a congested network link 206, the traffic is examined to determine if the traffic is carrying compressed content—the determination of which can be done either by software or hardware or a combination thereof. If the content is compressed, the content is decompressed and passed through a cache 214. The cache examines whether it has matching files (or portions thereof); and if the cache does, those matching files (or portions thereof) are replaced by a short index that uniquely identifies a particular content. The output of the cache 214 is then compressed. If this process does not reduce content size, then the original compressed content is transmitted. If the process does reduce content size, the output of the cache is transmitted to the other end of the link.

At the other end of the congested link, if the received content is the compressed output of the cache at the transmitting end of the link, then the content is recovered by inversing the steps. The output is decompressed at 216 and the decompressed content is parsed to identify cache indices. These cache indices are replaced by appropriate content from the cache 220 at the receiving end of the link, reconstructing the original uncompressed byte stream. The uncompressed byte stream is then compressed and sent out in its original form.

In an embodiment of the invention, both ends of the link, the sender and the receiver, use the uncompressed data in order to update their cache content, i.e., all the uncompressed data (as well as other data that were not originally compressed by the end-points of the link) are stored in the sender and receiver caches and get replaced using known replacement policies.

Figure 3:
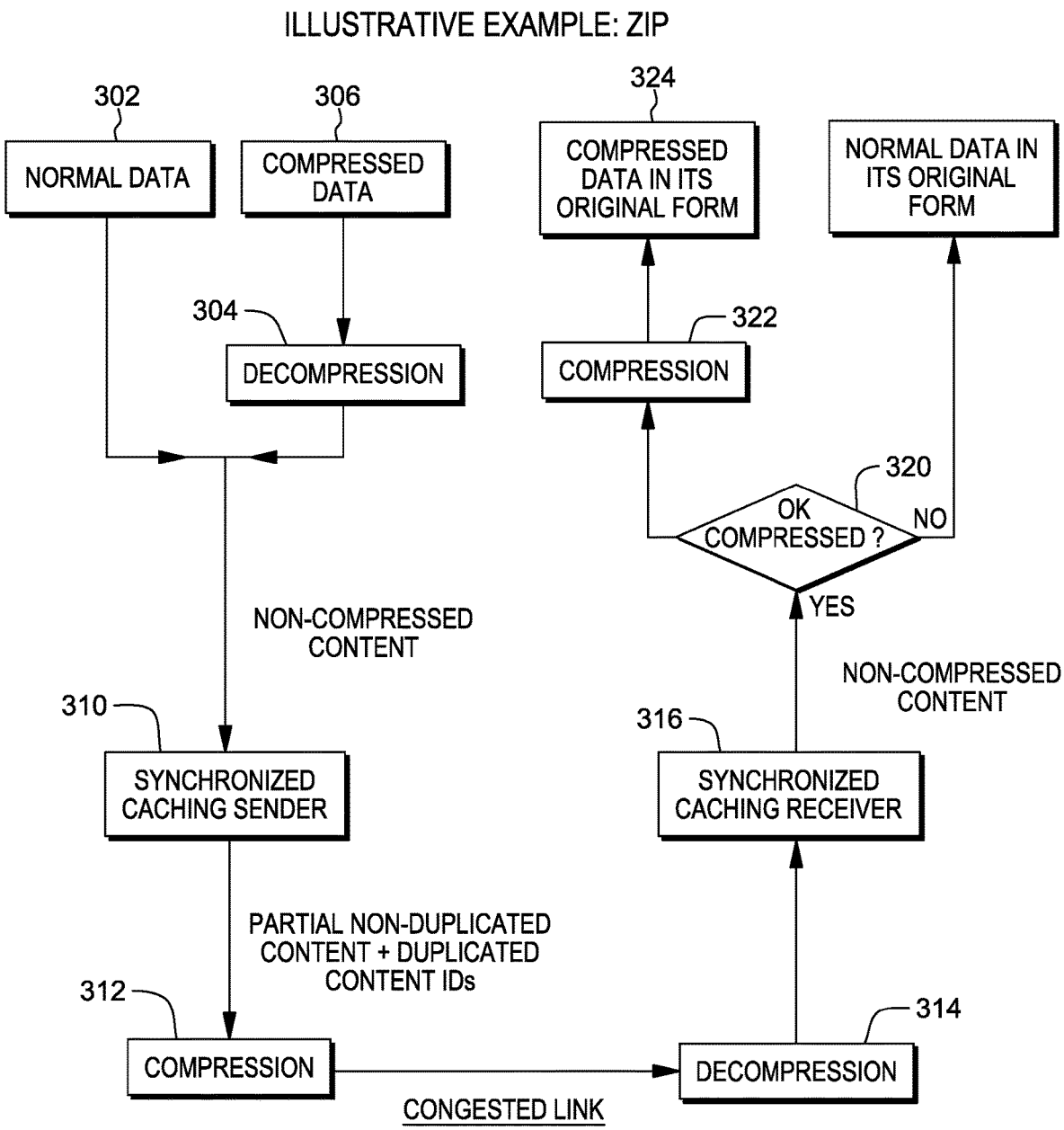
FIG. 3 illustrates a process employing the synchronized caching sender and caching receiver of FIG. 2 in accordance with an embodiment of the invention.

FIG. 3 shows the main steps involved in embodiments of the invention. These embodiments use the synchronized caching sender 202 and receiver 204 on either side of the congested network link 206. Normal (i.e. uncompressed) data 302 is examined by the caching sender in order to determine if the data is new, and hence needs to be transmitted or if the data is cached data that only requires an identifier to be transmitted. The synchronized caching receiver resides on the other end of the network link and communicates to the sender if the data (or portions of the data) is cached.

Embodiments of the invention enable compressed data to be cached by introducing a decompression module 216 before the caching sender 202. This module, at 304, decompresses compressed data 306, and passes the decompressed data on, at 310, to the caching sender, which then, at 312, performs the same operations as it did on the normal, uncompressed data.

The caching sender 202, in embodiments of the invention, sends uncompressed or decompressed data to the caching receiver 204. Compressed data is decompressed at 314, the caching receiver, represented at 316, distinguishes, at 320, between data that was and data that was not originally compressed, and the caching receivers is also equipped with the logic 322 to compress originally compressed data, reconstructing at 324 the originally compressed data while serving from its cache 220. Normal (originally uncompressed) data is served, at 326 without any modification.

If the data examined by the caching sender was uncompressed, the caching sender sends this data, or an identifier, to the caching receiver. If the original, uncompressed data is sent to the receiver, the receiver can output this data, and also cache a copy of the data for possible future use. If the identifier was sent to the receiver, the receiver uses this identifier to retrieve the original, uncompressed data from the receiver cache. If the receiver receives data that had been decompressed by the sender, the receiver can recompress this data and output the data in that recompressed form. The receiver may also store a copy of this data—in a compressed form or a decompressed form—for possible future use.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention for various embodiments with various modifications as are suited to the particular use contemplated.

What is claimed is:

1. A method of transmitting content across a link in a communications network, the method comprising:
    examining specified traffic in the network at a sender end of the link to determine if the traffic is carrying any compressed content;
    when the specified traffic is carrying compressed content, decompressing, at the sender end of the link, at least one portion of the compressed content to obtain decompressed data, decompressed at the sender end of the link from the compressed content in the examined specified traffic;
    comparing the decompressed data, decompressed at the sender end of the link from the compressed content from the specified traffic, with content of a sender cache to determine if the sender cache has content matching the decompressed data obtained from the compressed content from the specified traffic;
    when the sender cache has content matching the decompressed data, decompressed at the sender end of the link from the compressed content from the specified traffic, determining an identifier associated with said decompressed data obtained from the compressed content from the specific traffic; and
    using the associated identifier to reconstruct, at a receiving end of the link, the decompressed data, decompressed at the sender end of the link from the compressed content from the specified traffic.

2. The method according to claim 1, wherein the using the associated identifier includes replacing the at least one decompressed portion of the content from the specified traffic with the associated identifier.

3. The method according to claim 2, wherein the using the associated identifier further includes:
    determining an index for identifying said at least one decompressed portion of the content; and
    compressing said index to form the associated identifier.

4. The method according to claim 3, wherein the using the associated identifier further includes sending the associated identifier over the link to the receiving end of the link.

5. The method according to claim 1, further comprising:
    using the decompressed data obtained from the compressed content from the specified traffic to update the sender cache and to update a receiver cache at the receiver end of the link; and
    using non-compressed content from the specified traffic to update the sender cache and the receiver cache.

6. The method according to claim 1, wherein the using the associated identifier includes only using the associated identifier to reconstruct the at least one decompressed portion of the content from the specified traffic when one or more given conditions are satisfied.

7. The method according to claim 6, further comprising when said one or more conditions are not satisfied, sending said compressed content in the specified traffic to the receiving end of the link.

8. The method according to claim 1, wherein the examining specified traffic in the network at a sender end of the link includes examining said specified traffic before the specified traffic enters the link.

9. The method according to claim 1, wherein the using the associated identifier includes only using the associated identifier to reconstruct the at least one decompressed portion of the content from the specified traffic when one or more given conditions are satisfied.

10. A system for transmitting content across a link in a communications network, the system comprising:
    a caching sender at a sender end of the link, and a caching receiver at a receiver end of the link, for exchanging data packets over the link;
    the caching sender including a first cache, and the caching receiver including a second cache;
    the caching sender for examining specified traffic in the network to determine if the traffic is carrying any compressed content; and when the specified traffic is carrying compressed content, for decompressing, at the sender end of the link, at least one portion of the compressed content to obtain decompressed data, decompressed at the sender end of the link from the compressed content in the examined specified traffic, and comparing the decompressed data, decompressed at the sender end of the link from the compressed content from the specified traffic with content of the first cache to determine if the first cache has content matching the decompressed data obtained from the compressed content from the specified traffic; and when the first cache has content matching the decompressed data, decompressed at the sender end of the link from the compressed content from the specified traffic, determining an identifier associated with said decompressed data obtained from the compressed content from the specified traffic; and the caching receiver for receiving the associated identifier from the caching sender, and using the associated identifier to reconstruct the decompressed content, decompressed at the sender end of the link from the specified traffic.

11. The system according to claim 10, wherein the caching sender:
   replaces the at least one decompressed portion of the content from the specified traffic with the associated identifier; and
   sends the associated identifier over the link to the caching receiver.

12. The system according to claim 11, wherein the caching receiver:
   uses the associated identifier to obtain, from a second cache, a copy of the at least one decompressed portion of the content from the specified traffic.

13. The system according to claim 10, wherein the caching sender examines said specified traffic before the specified traffic enters the link.

14. The system according to claim 10, wherein the caching sender determines if any content of the specified traffic is cached at the receiver end of the link.

15. An article of manufacture comprising:
   at least one tangible computer readable device having computer readable program code logic tangibly embodied therein to transmit content across a link in a communications network, the computer readable program code logic, when executing, performing the following:
   examining specified traffic in the network at a sender end of the link to determine if the traffic is carrying any compressed content;
   when the specified traffic is carrying compressed content, decompressing, at the sender end of the link, at least one portion of the compressed content to obtain decompressed data, decompressed at the sender end of the link from the compressed content in the examined specified traffic;
   comparing the decompressed data, decompressed at the sender end of the link from the compressed content from the specified traffic with content of a sender cache to determine if the sender cache has content matching the decompressed data obtained from the compressed content from the specified traffic;
   when the sender cache has content matching the decompressed data, decompressed at the sender end of the link from the compressed content from the specified traffic, determining an identifier associated with said decompressed data obtained from the compressed content from the specified traffic; and
   using the associated identifier to reconstruct, at a receiving end of the link, the decompressed data, decompressed at the sender end of the link from the compressed content from the specified traffic.

16. The article of manufacture according to claim 15, wherein the using the associated identifier includes:
   replacing the at least one decompressed portion of the content from the specified traffic with the associated identifier; and
   sending the associated identifier over the link to the receiving end of the link.

17. The article of manufacture according to claim 15, wherein the examining specified traffic in the network at a sender end of the link includes examining said specified traffic before the specified traffic enters the link.

18. A method of saving bandwidth in transmission of compressed data, the method comprising:
   examining specified traffic in the network at a sender end of a network link to determine if the traffic is carrying any compressed content;
   when the specified traffic is carrying compressed content, decompressing, at the sender end of the link, at least one portion of the compressed content to obtain decompressed data, decompressed at the sender end of the link from the compressed content in the examined specified traffic;
   comparing the decompressed data, decompressed at the sender end of the link from the compressed content from the specified traffic with content of a sender cache to determine if the sender cache has content matching the decompressed data obtained from the compressed content from the specified traffic;
   when the sender cache has content matching the decompressed data, decompressed at the sender end of the link from the compressed content from the specified traffic, replacing said decompressed data obtained from the compressed content from the specified traffic with an associated index;
   compressing said index to form a compressed identifier;
   sending the compressed identifier over the link to a receiver end of the link;
   at the receiver end of the link, decompressing the compressed identifier to form the index associated with the decompressed data, decompressed at the sender end of the link from the compressed content from the specified traffic; and
   replacing the index with content from a receiver cache to reconstruct, at the receiver end of the link, the decompressed data obtained from the compressed content from the specified traffic.

19. The method according to claim 18, wherein the sending the compressed identifier over the link includes only sending the compressed identifier over the link when one or more given conditions are satisfied.

20. The method according to claim 19, further comprising when said one or more conditions are not satisfied, sending said compressed content in the specified traffic to the receiver end of the link.

21. The method according to claim 20, further comprising:
   determining a size of the compressed identifier and a size of the at least on portion of the compressed content from the specified traffic; and wherein:
   the sending the compressed identifier to the receiver end of the link includes sending the compressed identifier to the receiver end of the link when the size of the compressed identifier is smaller than the size of the at least on portion of the compressed content from the specified traffic; and
   the sending the compressed content in the specified traffic to the receiver end of the link includes sending the at least on portion of the compressed content to the receiver end of the link when the size of the at least on portion of the compressed content is smaller than the size of the compressed identifier.

22. The method according to claim 18, wherein the examining specified traffic in the network at a sender end of the link includes examining said specified traffic before the specified traffic enters the link.

* * * * *